Dec. 16, 1930. H. W. NORGAARD 1,785,014
FRUIT PITTER
Filed March 30, 1925 5 Sheets-Sheet 1

Fig. 1.

INVENTOR.
H. W. Norgaard,
BY
Geo. P. Kimmel.
ATTORNEY.

Dec. 16, 1930.  H. W. NORGAARD  1,785,014
FRUIT PITTER
Filed March 30, 1925   5 Sheets-Sheet 4

INVENTOR.
H. W. Norgaard,
BY
Geo. P. Kimmel, ATTORNEY.

Dec. 16, 1930.    H. W. NORGAARD    1,785,014
FRUIT PITTER
Filed March 30, 1925    5 Sheets-Sheet 5

INVENTOR.
*H. W. Norgaard,*
BY
*Geo. P. Kimmel.*   ATTORNEY.

Patented Dec. 16, 1930

1,785,014

UNITED STATES PATENT OFFICE

HAL W. NORGAARD, OF BURBANK, CALIFORNIA, ASSIGNOR TO PACIFIC MACHINERY COMPANY, OF SAN FRANCISCO, CALIFORNIA, A CORPORATION OF CALIFORNIA

FRUIT PITTER

Application filed March 30, 1925. Serial No. 19,392.

This invention relates to a fruit pitting machine designed primarily for the pitting of peaches of the cling type, but it is to be understood that a machine, in accordance with this invention, is adapted for any purposes for which it is found applicable, such as the pitting of apricots, plums, peaches other than that of the cling type, and other fruit, and the invention has for its object to provide, in a manner as hereinafter set forth, a machine of the class referred to for overcoming the expensive and slow method of hand pitting now employed, and further for expeditiously and uniformly cutting the fruit in half and for simultaneously pitting the halves.

Further objects of the invention are to provide, in a manner as hereinafter set forth, a fruit pitting machine which is comparatively simple in its construction, strong, durable, obtaining great saving in building space when used, materially increasing the pitting output over the method of hand pitting now employed, greatly reducing the cost of labor in connection with fruit pitting, thoroughly efficient and convenient in its use, and comparatively inexpensive to set up.

With the foregoing and other objects in view the invention consists of a novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Referring to the drawings in detail 1 indicates a base into which the frame of the machine is mounted, and said base 1 consists of a pair of opposed channel irons 2, 3 connected together by brace members 4, 5, which are anchored in position. Extending from the base 4 forwardly thereof is a channel member 6.

The frame of the machine comprises a pair of tapering side members each consisting of a forwardly inclined rear bar 7, a rearwardly inclined front bar 8, a connecting bar 9 arranged between and secured to the bars 7, 8, and a top bar 10. The side members of the frame are arranged in spaced relation and one extends into a channel member 2 and the other into a channel member 3 and the said side members are connected together by a brace member 11.

The machine frame further includes a pair of forwardly extending arms 12, which are secured, as at 13 to the upper ends of bars 8, and connected to said arms 12, as at 14, is a supporting member 15. The arms 12 have the member 15 mounted thereon.

The machine frame further includes a conveyor support formed of a pair of spaced standards 16, 17, connected together at their tops by a cross piece 18 which forms a support for a platform 19. The cross piece 8 is arranged at the forward end of the platform 19 and the latter is supported at its rear end by a pair of standards 20. The standards 16 extend in the channel member 6 and the standards 20 are positioned exteriorly of the channel member 6 and secured to the brace member 4. The conveyor support is positioned at the longitudinal center of the machine and projects forwardly with respect to the side members of the machine frame. The supporting member 15 is arranged above the conveyor support.

Secured to the front of each of the bars 8, intermediate the upper and lower ends thereof, is a bearing 21 and journaled in said bearings 21, as well as projecting laterally from one of the said bearings, is a conveyor operating shaft 22, carrying on its projecting end, a gear wheel 23.

The shaft 22, has secured thereto a sprocket pinion 24, arranged at the longitudinal center of the machine, and which engages and operates an endless conveyor 25 of the chain link type. The conveyor 25 travels over a sprocket pinion 26, carried by a shaft 27, journaled in bearings 28 secured to the standards 16 and 17. The conveyor 25 travels between the supports 16 and 17, between the supports 20 and over and in proximity to the platform 19 which prevents sagging of the upper portion of the conveyor. Secured to the conveyor 25, at spaced terminals, is a series of fruit carriers 29 and into said carriers is successively positioned the fruit so that the latter will be conveyed to be pitted. The conveyor 25, is intermittently operated and the means for operating the shaft 22 for the purpose of intermittently shifting the conveyor 25 will be presently referred to.

Secured to the top edge of each of the bars 9 is a bearing 30 and journaled in said bearings is a shaft 31 for operating a circular saw or cutter 32 employed for cutting the fruit into halves. The shaft 31 extends from one of the side members of the machine frame and carries a worm pinion 32', which is continuously driven from a worm 32'' carried by a shaft 33, provided with another worm 33' operated by a worm gear 34, secured to the operating shaft 35 of the machine. Supports 35' are provided for the shaft 33. The shaft 35 carries a drive pulley 36 operated through the medium of a transmission 37 driven from a prime mover, not shown. Bearings 38 are secured to the top bars 10 and in which is journaled the shaft 35 and said shaft projects from each of said bearings. One of the projecting ends of the shaft 35 is provided with the sprocket gear 34 and a pulley 36 and the other projecting end carries a pinion 39, which meshes with a pinion 40, fixed to a transmission shaft 41, journaled in bearings 42 secured to the top bars 10.

One end of the shaft 41 projects outwardly from one of the bearings 42 and the said projecting end is not only provided with the pinion 40 but also with a series of Geneva lock motion wheels 43, 44, and 45. The Geneva wheel 43 coacts with and drives a Geneva wheel 46, carried by a shaft 47. The Geneva wheel 44 coacts with and drives a Geneva wheel 48 carried by a shaft 49. The Geneva wheel 45 coacts with and drives a Geneva wheel 50 carried by a shaft 51. The Geneva wheels provide means for intermittently operating the several mechanisms of the machine at the desired time and for the desired period.

Bearings 52 are secured to the rear bar 7 and in which is journaled the shaft 47. Bearings 53 are secured to the rear bars 7 and in which is journaled the shaft 51. The bearings 53 are arranged below the bearings 52. Bearings 54 are secured to the top bars 10 and in which is journaled the shaft 49. The shafts 47, 49 and 51 project from one of the side members of the machine frame and on said projecting ends of said shafts the Geneva wheels referred to are fixed. The shaft 49, inwardly with respect to the Geneva wheel 48 carried thereby, is provided with a gear wheel 55 which meshes with the gear wheel 23, on the shaft 22 and intermittently operates shaft 22 when shaft 49 is driven.

The machine includes a combined fruit holding and positioning mechanism which is operated from the shaft 49 and the function of said mechanism is to remove the fruit from a carrier 29, and convey it to a position to be acted on by the saw 32 whereby the fruit will be halved in a uniform manner, after which the halves are conveyed to a position to be acted upon by the combined cutter and feeler mechanism, so that each half will be pitted. The combined fruit holding and positioning mechanism is best shown in Figures 3 and 4 to 8, and the said mechanism comprises a pair of oppositely disposed synchronously and intermittently operable combined fruit pick up and carrying devices, each having a series of fruit holding cups, and with the cups of one device opposing and operating in conjunction with the cups of the other device to transport the fruit to be pitted. Each of said devices further includes a cylindrical housing open at its inner end and suspended from its outer end and within the machine frame by a pair of hangers 56 and 57 secured to a frame side member. The hangers project a substantial distance inwardly from the side members of the machine frame, are secured as at 58, to the top bars of said members, and are further secured as at 59 and 60 to the outer end of the housing. One of the housings is generally referred to by the reference character 61 and the other by the reference character 62.

Each of said housings consist of an annular body portion 63 having its ends formed with inwardly extending flanges 64, 65. To the flange 64, is secured by the holdfast devices 65', a closure plate 66 for the outer end of the body portion 63. The plate 66 centrally thereof is formed with an opening 67 for the passage of the shaft 49. Secured to the inner face of the flange 65, by the holdfast devices 68, is an annulus 69 having its inner edge toothed throughout, as at 70, to provide a circular rack at the open inner end of the housing.

Positioned against the inner face of the plate 66, as well as being secured therewith by the holdfast devices 71 is a cylindrical member 72 provided with a central bore 73 of greater diameter than the shaft 49 and through which said shaft extends. The periphery of the member 72 is formed with a circumferentially extending continuous cam groove 74. The member 72 and the groove 74 provides a cam element.

Within the body portion 63, in proximity to the inner end of the member 72, is a circular plate 75 provided with a hub 76. The shaft 49 extends through the plate 75, and the hub 76 is fixedly secured to the shaft 49, by a set screw 77. By this arrangement the plate 75 will be carried with the shaft 49 when the latter is operated. The plate 75 in proximity to its outer edge is formed with a series of hollow cylindrical supports 78, four in number, and said supports extend from each face of the plate 75. Slidably mounted in each of the supports 78, as well as capable of being shifted lengthwise with respect to the support, is a hollow cylindrical carrier 79, for a spring controlled elongated fruit holding cup spindle 80, formed with lengthwise extending grooves 81 in which extend bearing balls 82. See Figures 12, 13 and 14. Each of the carriers 79 at one end is formed with an opening 82', for the passage of the spindle 80 and the latter has that end thereof which is arranged within the carrier 79, provided with a disc 83 against which abuts a coiled spring 84. That end of the carrier 79, opposite the end thereof formed with the opening 82', is closed by a screw cap 85, for confining the spring 84.

Fixedly secured to the carrier 79, in proximity to that end closed by the plug 85, by a set screw 86 is a collar 87 having connected therewith, by a headed securing element 88, a roller 89, which is arranged in the groove 74, and travels through the latter when the plate 75 is revolved by the shaft 49, and during the travel of the roller 89, through the groove 74, the carrier 79, is shifted towards and away from the inner end of the body portion 63. On the shifting movement of the carrier 79, the spindle 80 is carrier therewith. The spindle 80 is threaded, as at 90 and which provides means for securing to the spindle a fruit holding cup 91. A securing nut 91' abuts the cup 91. The bearing balls 82, which surround the spindle 80, are maintained in position, by retaining devices 91', which are secured as at 92, to the web 93 of a pinion 94, which meshes with the teeth 70 of the annulus 69. The balls 82 constitute the hub of the pinion 94 and connect the latter to the spindle 80, but allow for the spindle to shift through the pinion. For maintaining the pinions 94, in mesh with the teeth 70, a series of holding yokes 95 are provided, one for each spindle 80 and the latter extends through its respective yoke. See Figure 7. The cups 91 are held in yielding engagement with the fruit through the medium of the coiled springs 84.

Figures 9, 10, 11, 12, 13, 14:
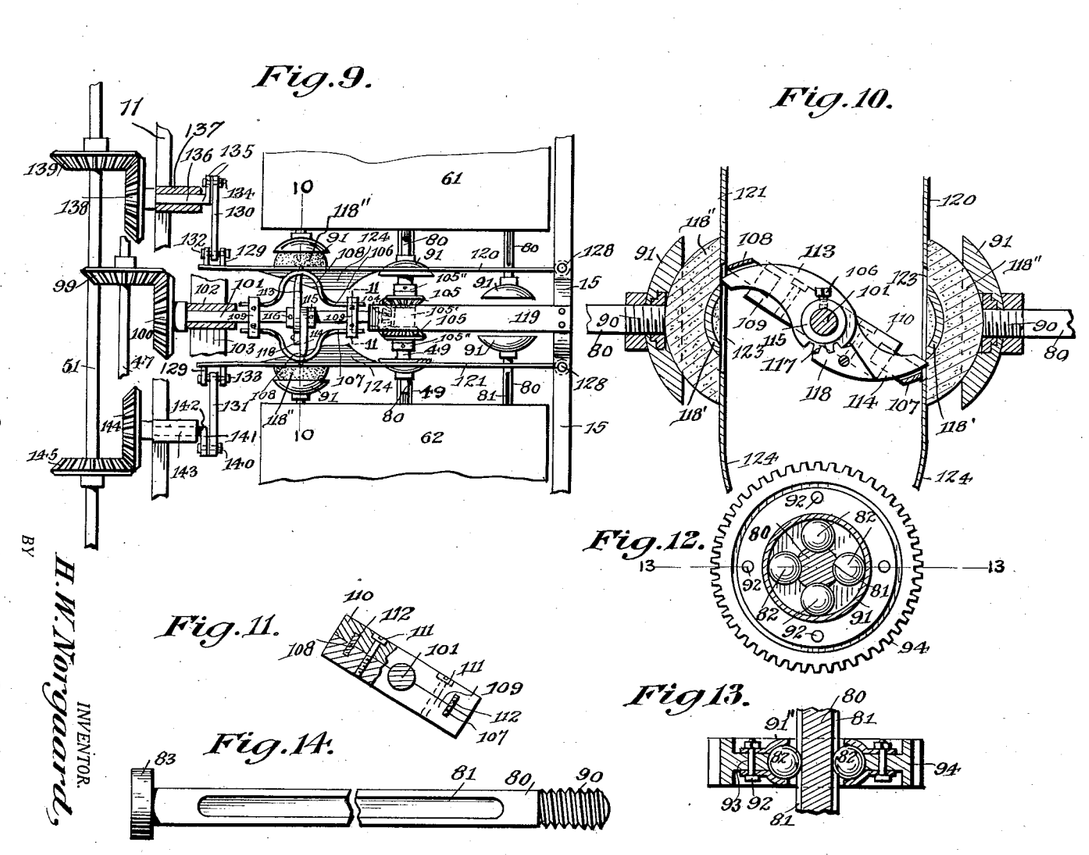
Figure 9 is a fragmentary view, in plan, of the combined cutter and feeler mechanism.
Figure 10 is a section on line 10—10, Figure 9.
Figure 11 is a section on line 11—11, Figure 9.
Figure 12 is a detail view illustrating a rotatable element for a fruit holding cup.
Figure 13 is a horizontal view on line 13—13, Figure 12.
Figure 14 is an elevation of a cup spindle.

After the fruit has been cut in half by the saw 32, it is conveyed by the fruit holding and positioning mechanism to a point to be operated upon by the combined cutter and feeler mechanism which simultaneously pits the halves of the fruit, and this latter mechanism, best shown in Figures 9 and 10, is operated from the shaft 47. The mechanism consists of a bevel gear 99 carried by the shaft 47, which meshes with a bevel gear 100, fixed to the rear end of a combined cutter and feeler finger shaft 101, journaled in a bearing 102, carried by a support 103. The shaft 101 at its forward end is provided with a bevel gear 104, which meshes with bevel gears 105, loosely mounted on the shaft 49, spaced by a sleeve 105' and held by collars 105". Connected to the shaft 101, is a pair of oppositely extending cutter bars 106 and 107, provided centrally thereof with an offset curved cutting portion 108. The bars 106 and 107 are connected with the shaft 101 by a pair of coupling devices 109, see Figure 11. Each of said coupling devices consists of a pair of opposed bars 110, secured together by the holdfast devices 111 and these latter detachably clamp the coupling devices in position to the shaft 101. The end terminal portions of the cutter bars extend through the coupling devices, as indicated at 112, see Fig. 11.

Figure 1:
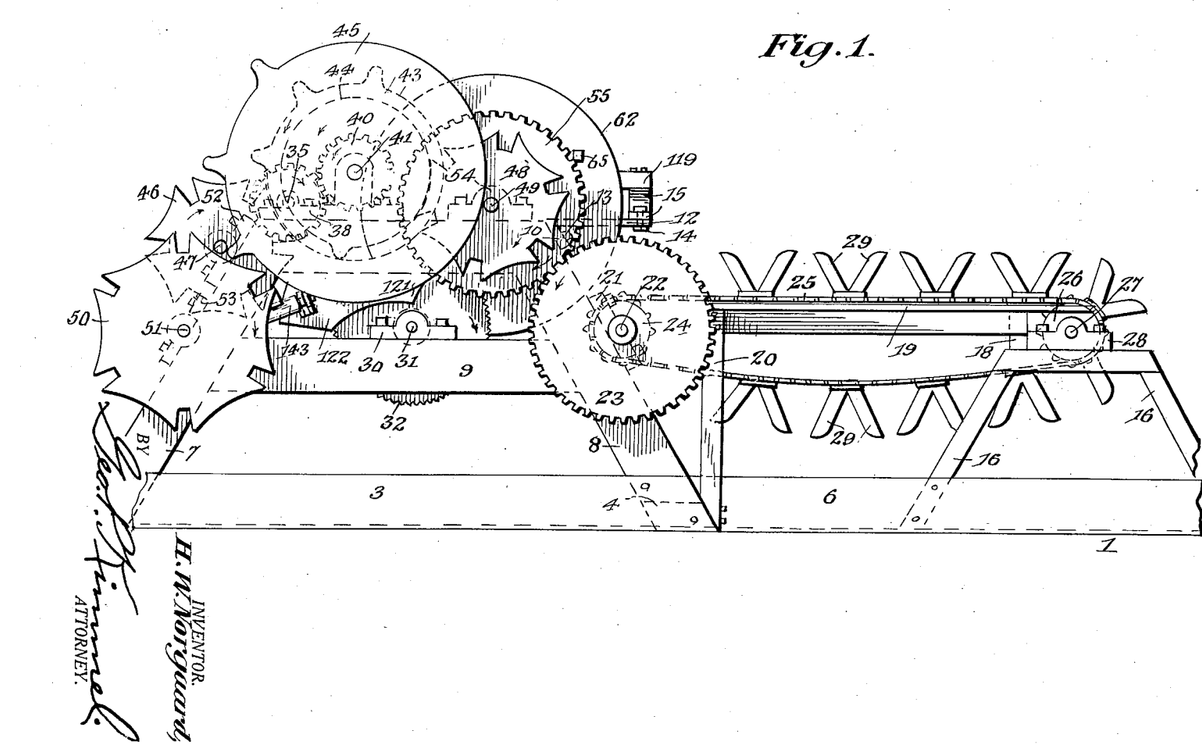
Figure 1 is a side elevation, partly broken away, of a fruit pitting machine in accordance with this invention.
Figure 2:
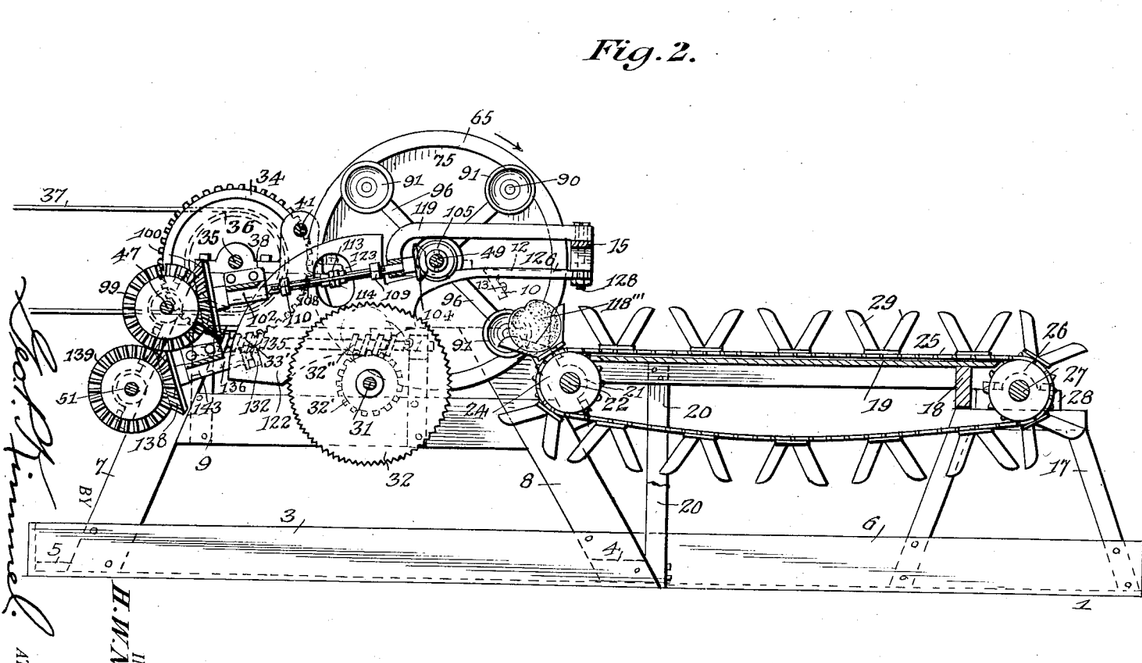
Figure 2 is a longitudinal sectional view thereof.

Mounted loosely on the shaft 101 is a pair of oppositely disposed curved feeler fingers 113 and 114 which abut at their inner ends and extend through and beyond the curved cutting portions 108. The fingers 113, 114 are arranged between a pair of collars 115 which are fixed to the shaft 101 by the set screws 116. The feeler finger 113 is toothed as at 117, and engaging with the teeth of said fingers is a spur pawl 118 carried by the finger 114. The pawl 118 in connection with the teeth 117 provides means for assuring proper placement of the feeler fingers. The feeler fingers engage the pits 118' of the halves 118" of the fruit in advance of the cutting out of the pits from the fruit 118''' by the curved cutting portions 108 of the cutter bars, see Fig. 10. Connected to the supporting member 15 and extending rearwardly therefrom, is an angle-shaped arm 119 for supporting the shaft 101 at its forward end. See Fig. 2.

The machine further includes a pair of combined separating and guide wings acting on the halves of the fruit to hold the same in the cups and also as guides when the halves of the fruit are conveyed by the cups to a position to be simultaneously operated upon by the combined cutter and feeler mechanism.

The wings are best shown in Figures 3, 9, 10, 15 and 16. One of said wings is indicated at 120 and the other at 121. Each of the wings consist of substantially quadrangular body portion 122, provided with a vertically disposed oval-shaped opening 123. The body portion 122 has the lower part of its forward portion inclined in an inward direction as indicated at 124. The body portion 122 is extended forwardly as at 125 and terminates in a shank 126, which is pivotally connected, as at 128, to the supporting member 15, at one side of the vertical center thereof. The outer face of the body portion 122 at the rear end thereof has a pair of laterally extending apertured lugs 129. The wings 120 and 121 are oscillated in a direction towards and from the saw 32 and their movement is such, that after the fruit has been cut in half, the wings will bear against one half of the fruit and act to retain it in a fruit holding cup, and as the cup moves upward the half will be carried therewith until it reaches the opening 123, and at this time the half will be acted upon by the combined cutter and feeler mechanism for the purpose of the pitting thereof. After the pitting operation the wing moves away from the half and the latter drops from the fruit holding cup upon a suitable conveyor, not shown, and the pitted halves are conveyed from the machine to the desired point.

The wings 120 and 121 operated alternately in opposite directions, that is to say one movement of the wings will be towards the saw 32 and the other movement in a direction away from the saw. The shifting of the wings 120 and 121, in a manner as stated, is had through the medium of a pair of links 130 and 131. The link 130 at its inner end is pivotally connected, as at 132 to the ears 129 of the wing 120, and the link 131 is connected at 133 to the ears 129 of the wing 121.

The outer end of the link 130 is pivotally connected as at 134 to a crank 135 formed on the forward end of a shaft 136, mounted in a bearing 137, and said shaft has its rear end provided with a bevel gear 138, which meshes with a bevel gear 139, carried by the shaft 51.

The link 131 has its outer end, pivotally connected as at 140, to a crank 144 formed on the forward end of a shaft 142, mounted in a bearing 143, and said shaft has its rear end provided with a bevel gear 144, which meshes with a bevel gear 145, carried by the shaft 51.

The shafts 136 and 142, owing to their gear connection with the shaft 51, are driven in a manner to simultaneously move the wings 120 and 121 away from each other and simultaneously move said wings towards each other. The operation of the wings 120 and 121, is an intermittent one, and is controlled throughout the medium of the lock motion Geneva wheel 50 carried by the shaft 51, and operated from the Geneva wheel 45 carried by the shaft 41.

The operation of the combined cutter and feeler mechanism is intermittent and its operation is controlled by the lock motion Geneva wheel 46 on the shaft 47, and driven from the Geneva wheel 43 carried by the shaft 41.

The operation of the combined fruit holding and positioning mechanism is intermittent, and its operation is controlled by the Geneva lock motion wheel 48 carried by the shaft 49, and operated from the Geneva wheel 44 fixed to the shaft 41. The Geneva lock motion wheel 48 also controls the operation of the conveyor mechanism, in view of the fact that such mechanism, is driven through the medium of the gear wheel 55 carried by the shaft 49 and which meshes with and intermittently drives the gear wheel 23.

As before stated the saw 32 is continuously operated when the operating shaft 35 is driven from the prime mover, not shown.

The fruit to be pitted is successively mounted in the carriers 29 on the conveyor 25. The intermittent operation of the conveyor is such that its stoppage will be of sufficient duration to hold the fruit for a sufficient period, so that it can be grasped by a pair of opposed cups 91. The combined fruit holding and positioning mechanism operates at times not only during the operation of the conveyor mechanism, but also during the intermittent stoppage of such mechanism.

When the plate 75 is revolved by the shaft 49, the spindles 80, having the cups 91, secured thereto, are carried with the plate 75, but said spindles are also revolved due to the action of the pinions 84, traveling over the teeth 70, and by this arrangement although the cups are carried in the circular path, yet they are revolving when traveling in such path. The revolving of the cups prevent the impairing of the fruit which the latter is carried thereby.

The cam groove 74, in connection with the rollers 89, provide for projecting and withdrawing the cups. The groove 74 is of such contour, that the cups will be projected to their fullest extent when a pair of opposed cups are positioned to remove the fruit from a carrier 29, as clearly shown in Fig. 3. As the fruit is moved in a direction towards the saw 32 the cups firmly grasp the same and hold it while the saw 32 is cutting the fruit in half. The shape of the groove 74 is such to overcome any retractive action on the cups from the time the fruit is grasped until the fruit has been severed and just prior to the passing of the fruit on the inclined portion 124 of the separating wings, 120—121.

Figures 3, 15, 16:
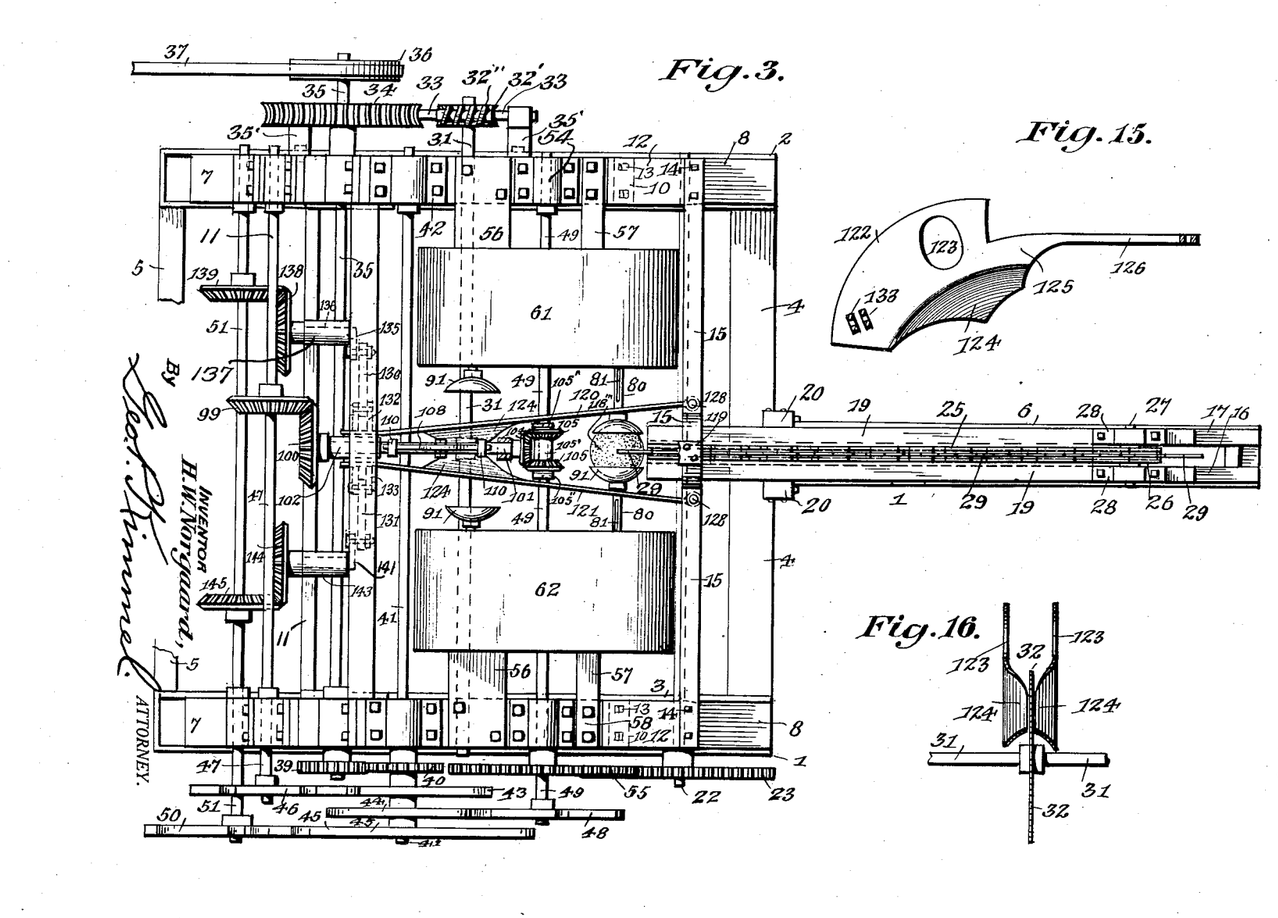
Figure 3 is a top plan view thereof.
Figure 15 is an elevation of one of the separating wings showing the arrangement of the fruit halving cutter or saw in connection therewith.
Fig. 16 is a sectional view through the separating and guide wings.
Figure 4:
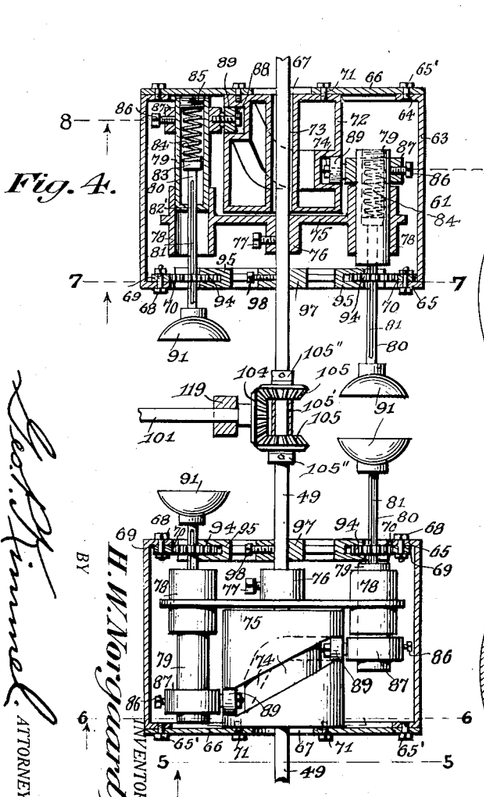
Figure 4 is a sectional plan of the combined fruit holder and positioning mechanism.
Figure 5:
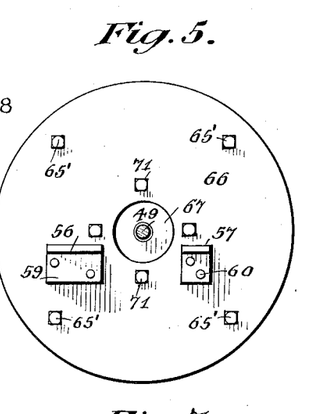
Figure 5 is a section on line 5—5, Figure 4.
Figure 6:
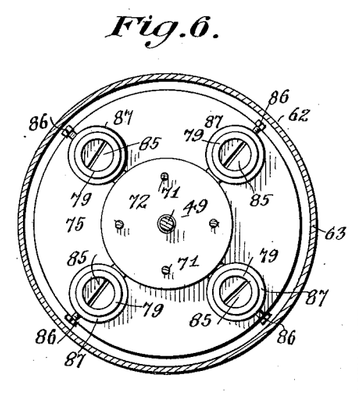
Figure 6 is a section on line 6—6, Figure 4.
Figure 7:
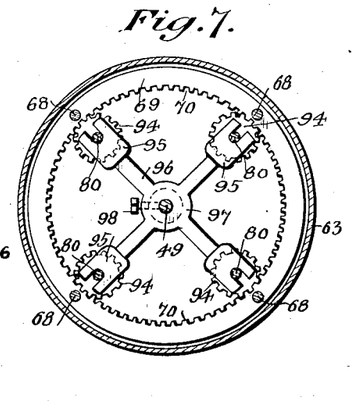
Figure 7 is a section on line 7—7, Figure 4.
Figure 8:
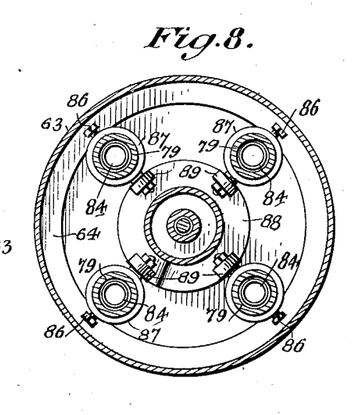
Figure 8 is a section on line 8—8, Figure 4.

After the fruit has been conveyed to the position shown in Fig. 3 and grasped by a pair of opposed cups 91, it is shifted to be acted upon by the saw 32 through the operation of the combined fruit holding and positioning mechanism.

When the saw 32 has severed the fruit in half, the separating wings at this time are at what may be termed closed position, as shown in Fig. 16. As the halves of the fruit travel against the outer faces of the separating wings, these latter move in an outward direction and hold the halves of the fruit in the cups 91, but the carriers are receding or moving away from the wings, due to the contour of the groove 74, in connection with the rollers 89, but as the spindles 80 are spring controlled, the controlling springs 84 will maintain the rotatable cups 91 against the fruit and also the fruit tightly against the outer faces of the wings. As the fruit, in the cups 91 is moved upwardly, the fruit will be shifted to oppose the openings 123, and at this time the operation of the combined fruit holding and positioning mechanism will be temporarily discontinued, and the combined cutter and feeler mechanism be thrown into action to operate through the openings 123 and pit the halves. In operation, the feelers 113 are normally free to move on their shaft 101. As this shaft rotates, it moves the knife members 108 which are fixed on the shaft so that a portion of the knife member will engage an end of the feeler and thereby dragging the feeler into engagement with the pit as shown in Fig. 10. The normal distance from the part of the knife which engages the feeler to the axis of the shaft 101 is less than the length of each feeler so that in order that the knife may pass the feeler the knife must spring outwardly. As the knife moves out in this way its shape is changed and as it clears the feeler it springs again to its normal position. As a result of this construction very little of the fruit is removed with the pit since the knife changes its shape while cutting and by changing the shape of the knife the pit is closely followed. Immediately after the pitting of the halves, the operation of the combined cutter and feeler mechanism will be temporarily discontinued, but at this time the combined fruit holding and positioning mechanism will be again thrown into operation.

When the wings 120 and 121 are moved outwardly, to the position shown in Fig. 9, so as to permit of the operation of the combined cutter and feeler mechanism the operation of the driving means for the wings will be temporarily discontinued and the wings will not be operated again, until the completion of the operation of the combined cutter and feeler mechanism and the latter will be moved to the position shown in Fig. 3, and at this time the operation of such mechanism will be discontinued. The wings will then be moved by their operating means to closed position, as shown in Fig. 3 and be held in such position temporarily, due to the fact that the operating means for the wings will be temporarily inactive and will not become active until the saw has cut the fruit and the cups holding the halves carry these latter to ride against the wings, and at this time the operating means for the wings will become active whereby the wings will be shifted to open position as shown in Fig. 9.

It is thought that the many advantages of a fruit pitting machine, in accordance with this invention, can be readily understood, and although the preferred embodiment of the invention, is as illustrated and described, yet it is to be understood that changes in the details of construction can be had which will fall within the scope of the invention as claimed.

What I claim is:—

1. In a device for removing pits from fruit, means for holding the fruit, a bodily revolvable cutter and feeler member arranged adjacent said means, said feeler being adapted to engage said pit and said knife being adapted to cut the pit from the halved fruit.

2. A pit remover for a fruit pitting machine, said pit remover including a shaft having a feeler mounted thereon, a curved knife adapted to engage said feeler, said knife being flexible, said knife being mounted to move independently of said feeler, the curvature of said knife being altered when it is engaged by said feeler.

3. In a device for removing pits from fruit, means for receiving and holding halved fruit, a rotatable cutter and feeler member arranged adjacent said means, said feeler being adapted to engage said pit and said knife being adapted to cut the pit from the halved fruit, said cutter and feeler being independently rotatable.

4. A machine for removing pits from fruit including means for holding halved fruit, said means including an apertured plate, a shaft mounted adjacent said aperture, said shaft having knife holding bars thereon, and a knife removably held on said bars.

5. A machine for removing pits from fruit including means for halving the fruit, means for holding the halved fruit, said last mentioned means including an apertured plate, a shaft mounted adjacent said aperture, said shaft having a flexible knife thereon, said knife being curved, means to cause said knife to engage the fruit and means to change the curvature of said knife as it passes through the fruit.

6. A machine for removing pits from fruit including a wall portion having an aperture therein, means to hold a halved fruit with the pit disposed adjacent said aperture, a shaft, said shaft having a knife thereon, said knife being flexible and being mounted to rotate with said shaft, and means on said shaft for engaging the pit.

7. In a fruit pitting machine, a device for holding fruit, means to advance fruit to said holding device, said advancing means acting on the fruit to prevent rotation thereof, means for halving the fruit while held in said device, means for separating said halves, said means including an apertured plate, a curved knife rotatable in said aperture, and a feeler arm coacting with said knife, said feeler arm being adapted to engage the pit.

8. In a device for removing pits from fruit, means for receiving and holding the fruit, means for halving the fruit, an apertured plate, means for moving the fruit against said plate with the pit in alignment with said aperture, a bodily revolvable cutter and feeler member arranged adjacent said aperture, said feeler being adapted to engage said pit and said knife being adapted to cut the pit from the halved fruit.

9. A machine for removing pits from fruit comprising means for halving the fruit, means to separate the halved fruit including a wall portion having an aperture therein, means to hold the halved fruit with the pit disposed adjacent said aperture, a shaft mounted adjacent said aperture, said shaft having a knife thereon, said knife being flexible and being mounted to rotate with said shaft, a feeler on said shaft for engaging the pit, said feeler coacting with said knife to change the shape thereof.

10. A machine for removing pits from fruit including means for halving the fruit, means for holding the halved fruit in position to be pitted, said last mentioned means including an apertured plate, a shaft mounted adjacent said aperture, said shaft having a flexible knife thereon, said knife being curved, means to cause said knife to engage the fruit and means to change the curvature of said knife as it passes through the fruit, said means including a feeler mounted on said shaft, said feeler engaging said pit and in turn being engaged by said knife.

11. A machine for removing pits from fruit comprising a device for engaging and holding the fruit, means for halving the fruit, means to separate the halved fruit including spaced wall portions having opposed apertures therein, means to hold said fruit with the pits disposed adjacent said apertures, a shaft mounted between said wall portions adjacent said apertures, said shaft having a plurality of knives thereon, said knives being flexible and being mounted to rotate with said shaft, feelers on said shaft, said feelers coacting with said knives to change the shape thereof, said knives being arranged to simultaneously remove the pits from the two parts of the halved fruit.

12. In combination, means for supporting a halved peach, a pitting member, a feeler adapted to engage the edge of the pit and to guide the pitting member over the edge of the pit, and means for actuating the pitting member.

13. In a fruit pitter comprising a movable knife for cutting the pit from a halved peach, a feeler traveling in advance of the knife adapted to contact the edge of the pit and guide the knife over the said edge.

In testimony whereof, I affix my signature hereto.

HAL W. NORGAARD.